Nov. 4, 1958 K. G. HERNQVIST 2,859,345

ELECTRICALLY TUNABLE OSCILLATOR

Filed March 12, 1953

INVENTOR.
Karl G. Hernqvist

BY Charles H. Brown

ATTORNEY

United States Patent Office 2,859,345
Patented Nov. 4, 1958

2,859,345

ELECTRICALLY TUNABLE OSCILLATOR

Karl G. Hernqvist, Princeton, N. J., assignor to Radio Corporation of America, a corporation of Delaware Application March 12, 1953, Serial No. 341,991

17 Claims. (Cl. 250—36)

This invention relates to electrically tunable oscillator circuits, and particularly, to oscillators wherein the frequency of oscillation is determined by the frequency of oscillation of an ion plasma in a vacuum tube. No frequency determining circuit components are employed. The frequency of oscillation is controllable by controlling the number of electrons supplied from a thermoemissive cathode to the ion plasma region in the vacuum tube.

While not limited thereto, the invention is particularly useful as a local oscillator in a radio receiver. The frequency of the local oscillator can be periodically swept over a band of frequencies to detect the presence of a radio frequency carrier in a corresponding radio frequency band. Such receivers are known as search receivers or spectrum analyzers.

It is an object of this invention to provide an improved oscillator circuit wherein the frequency of oscillation is determined by an ion plasma.

It is another object to provide an improved electrically tunable oscillator circuit.

It is a further object to provide an electrically tunable oscillator wherein the frequency of oscillation is determined by an ion plasma in a vacuum tube and wherein there are no external frequency determining circuit components.

In one aspect, the invention comprises an oscillator circuit including a tetrode vacuum tube. A frequency-determining voltage or signal is applied to the control grid. An oscillating ion plasma is created between the second grid and the plate. The frequency of oscillation of the plasma is determined solely by the ion density and this is controlled by controlling the number of electrons reaching the plasma region from the cathode.

It is a feature of the invention to create and maintain the ion plasma by introducing into the plasma region low velocity electrons in the form of secondary emission from the plate or emission from a secondary cathode.

These and other objects, aspects and features of the invention will be apparent to those skilled in the art from the following more detailed description taken together with the appended drawing wherein.

Figure 1:
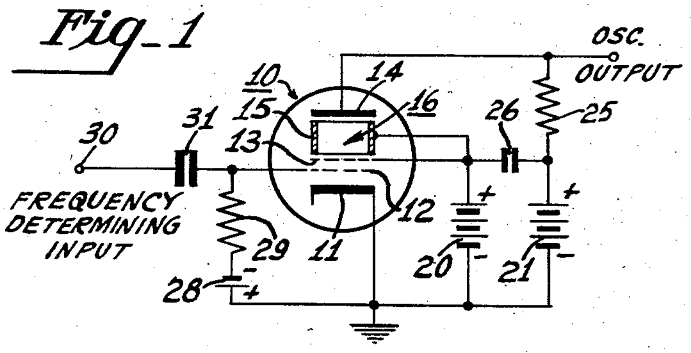
Fig. 1 is a circuit diagram of an ion plasma oscillator the output frequency of which can be electrically varied.
Figure 2:
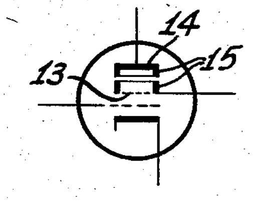
Figs. 2, 3 and 4 show modified forms of tubes which may be employed in the circuit of Fig. 1.
Figure 3:
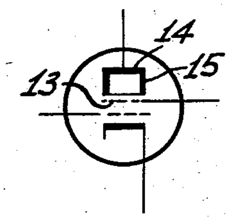
Figure 4:
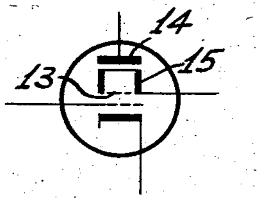

Referring to Fig. 1, a vacuum tube 10 includes a cathode 11 of the filamentary type or the indirectly heated type, a control grid 12, a screen or second grid 13, a plate 14 and a shield 15 which co-operates with the second grid 13 and the plate or collector electrode 14 to define an ion trapping enclosure or region 16. The shield 15 may be partially integral with the second grid 13 and partially integral with the plate 14 as shown in Fig. 2, or, the shield 15 may be entirely integral with the plate 14 as shown in Fig. 3, or, the shield 15 may be entirely integral with the second grid 13 as shown in Fig. 4. The pressure in the vacuum tube 10 may be in the order of between $10^{-2}$ and $10^{-8}$ millimeters of mercury. A pressure of $10^{-6}$ millimeters is commonly employed in commercial receiving-type vacuum tubes. Tube 10 is considered to be a vacuum tube in contradistinction from gas tubes, such as the "Plasmatron" tubes which have a pressure in the order of 1 millimeter of mercury. The function of a "Plasmatron" tube depends on the existence of an electron plasma. The function of the present oscillator depends on the existence in the vacuum tube of an ion plasma.

The positive terminal of a battery 20 or other source of unidirectional current is connected to the second grid 13 and the negative terminal is connected to the cathode 11. Battery 20 may provide a potential of 300 volts. The negative terminal of a battery 21 or other source of unidirectional current is connected to cathode 11 and the positive terminal is connected through an output impedance 25 to plate 14. Battery 21 may provide a potential of from 250 to 300 volts. Output impedance 25 may be a resistor or the primary coil of an output transformer. A by-pass capacitor 26 allows high frequency oscillatory currents to flow in the loop including output impedance 25, plate 14, and second grid 13 without going through batteries 20 and 21. Shield 15 may be connected to the same potential as is applied to second grid 13 (as shown in Fig. 1), or, it may be connected to the same potential as is applied to plate 14, or, it may be connected to a potential intermediate that of the second grid 13 and the plate 14.

The second grid 13, the plate 14, and the shield 15 are biased with the same order of positive potential relative to the cathode 11, so that the region 16 is substantially field-free. Therefore, a virtual cathode or cloud of electrons cannot be formed in the region 16, and as a result, an ion plasma is formed and trapped in the field-free region 16.

An input circuit is connected between the control grid 12 and the cathode 11. The input circuit includes means to bias the control grid 12 negative with respect to the cathode 11 and means to apply an input signal. In Fig. 1, the positive terminal of a bias battery 28 is connected to cathode 11 and the negative terminal is connected through a grid resistor 29 to control grid 12. An input terminal 30 is connected through a coupling capacitor 31 to control grid 12. Any suitable form of fixed bias or self bias or a combination thereof may be employed. The control grid 12 may be biased positive relative to the cathode 11 subject to the practical limitation of the current carrying ability of the control grid structure.

In the operation of the ion plasma oscillator of Fig. 1, primary electrons thermally emitted from cathode 11 are attracted through the control grid 12, the second grid 13, and the enclosure 16 to the positive plate 14. These relatively high velocity electrons having a velocity in the order of 100 electron volts strike plate 14 and cause relatively low velocity secondary electrons having a velocity in the order of 10 electron volts to be emitted from plate 15. The potential applied to the second grid 13 may be equal to or somewhat greater than the potential applied to plate 14. The space charge effect of the primary and secondary electrons causes a potential trough in the region 16 between the positive second grid 13 and the positive plate 14. The high velocity primary electrons strike residual gas molecules in the region 16 of the vacuum tube and produce positive ions. The positive gas ions tend to fall into the potential trough and neutralize the negative space charge effect of the electrons. This eliminates the potential trough and establishes an equilibrium condition in which an ion plasma is formed in the region 16 between second grid 13 and plate 14. A virtual cathode or cloud of electrons cannot be formed in the region 16 because of the presence of positive shield 15.

The ion plasma in region 16 oscillates back and forth between second grid 13 and plate 14 at a natural frequency which varies directly as the square root of the ion density. Under the equilibrium conditions existing, the electron density is equal to the ion density. Therefore the ion plasma oscillates at a frequency proportional to the square root of the electron density. The ion plasma in region 16 oscillates back and forth between second grid 13 and plate 14 at a natural frequency according to the formula:

$$f=2.15k\sqrt{\frac{J_a}{M\sqrt{V_a}}}$$

where $f$ is frequency in megacycles, $k$ is a geometry factor which is equal to 1 for plane parallel oscillations of the plasma and is equal to $1/\sqrt{2}$ for a cylindrical plasma column, $J_a$ is electron density in terms of milliamperes of anode current per square centimeter of effective anode area, $V_a$ is anode voltage and M is the molecular weight of the residual gas molecules. The number 2.15 is a constant including such factors as electron charge, electron mass, dielectric constant, etc.

The electron density, and thus the frequency of oscillation, can be electrically controlled by the voltage applied to control grid 12. The above formula may be rewritten as follows:

$$f=2.15k\sqrt{\frac{g_mV_c}{MA\sqrt{V_a}}}$$

where $g_m$ is the transconductance of the tube, $V_c$ is voltage on control grid 12, and A is the area of the plate in square centimeters.

The mechanism whereby direct-current energy from the batteries is transformed into alternating current to make up the losses in the oscillatory circuit will now be described. When secondary electrons are emitted from plate 14 toward the ion plasma, the plasma must assume a potential slightly less than the plate 14. Most of the secondary electrons have a low velocity and some of them are then reflected back into the plate 14 and only those which the ion plasma can neutralize are allowed to go into the plasma. The natural frequency oscillation of the plasma toward and away from plate 14 modulates the number of secondary electrons which pass into the plasma. This modulated flow of secondary electrons into the plasma interacts with the alternating current field inside the plasma to provide a transfer of direct current energy into alternating current energy.

Figure 6:
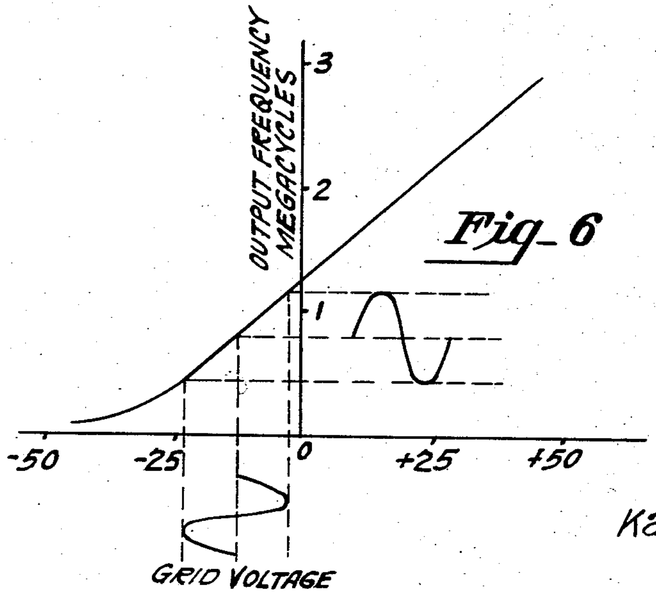
Fig. 6 is a chart of output frequency vs. voltage applied to the control grid, which will be referred to in explaining the operation of the oscillator.

In the use of the oscillator of Fig. 1, the voltage applied to control grid 12 determines the frequency of oscillation of the plasma in region 16 and the resulting frequency of oscillation in the electrical loop including second grid 13, plate 14, output impedance 25 and bypass capacitor 26. In the absence of a varying signal applied to input terminal 30, the oscillator oscillates at a frequency determined by the potential of bias battery or source 28. When a signal is applied to terminal 30, the frequency of oscillation changes according to the instantaneous value of the input signal. The relationship between grid voltage and output frequency is illustrated by the chart of Fig. 6. If a sine wave voltage is applied to input terminal 30, the output frequency of the oscillator sweeps through a range of frequencies in corresponding sine wave fashion. A sawtooth wave applied to input terminal 30 causes the output frequency to periodically sweep in a linear fashion through a band of frequencies. Oscillations in the range of from 0.5 to 10 megacycles have been produced.

Figure 5:
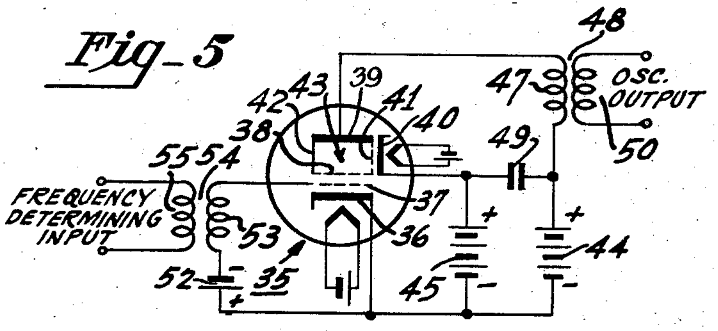
Fig. 5 is a circuit diagram of an ion plasma oscillator wherein the plasma is created and maintained by electrons from a secondary cathode.

Referring now to the oscillator circuit of Fig. 5, a vacuum tube 35 includes a first cathode 36, a control grid 37, a second grid 38, a plate 39, a secondary cathode 40 and a third grid 41. A shield 42 co-operates with second grid 38, plate 39 and third grid 41 to define a field free space or ion plasma region 43. The shield 42, second grid 38, plate 39 and third grid 41 may be a single structure or may be separate structures maintained at substantially the same positive direct-current potential by battery or source 44. This potential may be 300 volts. Secondary cathode 40 is maintained at a slightly lower positive potential than third grid 41 by means of battery or source 45. Battery 45 may provide a potential of 293 volts. Oscillations are present in the loop including secondary cathode 40, plasma region 43, plate 39, primary coil 47 of output transformer 48 and radio frequency by pass capacitor 49. An output is obtained from a secondary coil 50 of output transformer 48. Any suitable output impedance, such as a load resistor, may be employed in place of output transformer 48.

The input circuit includes a source 52 of fixed bias connected through the secondary 53 of an input transformer 54 to the control grid 37. A fluctuating frequency determining input voltage is applied to the primary coil 55 of input transformer 54. The frequency of oscillation of the oscillator is determined by the instantaneous potential applied between cathode 36 and control grid 37. Any suitable input circuit may be employed.

In the operation of the circuit of Fig. 5, an ion plasma is established in the region 43 having a natural frequency of oscillation determined by the density of the ion plasma, which in turn is determined by the potential on control grid 41. Since secondary cathode 40 is at a positive potential which is only slightly lower than the potential of third grid 41 and plate 39, low velocity electrons are fed into the plasma region 43. The ion plasma has a natural frequency of oscillation in region 43 toward and away from third grid 41. The oscillating plasma modulates the electron flow from secondary cathode 40 into the plasma region in such a way that when the electron flow interacts with the alternating current field inside the plasma there is a transfer of direct current energy into alternating current energy and simultaneously a modulation of the current flowing through the coils of output transformer 48. The oscillator of Fig. 5 does not rely on secondary emission of electrons from plate 39.

The explanation of the operation of the invention given herein is believed to be correct, but it may be incomplete. The validity of the invention is, of course, independent of the theory of opeartion advanced.

What is claimed is:

1. An electrically tunable oscillator comprising a vacuum tube including a residual amount of gas and having electrode means cooperating to define an ion trapping enclosure, said electrode means including a collector electrode, means to inject high velocity electrons into and thru said enclosure to said collector electrode, a source of low velocity electrons, means to inject said low velocity electrons into said enclosure, and an output circuit devoid of frequency determining elements connected to said collector electrode.

2. An electrically tunable oscillator as defined in claim 1 wherein said source of low velocity electrons is constituted by secondary electrons emitted from said collector electrode when hit by said high velocity electrons.

3. An electrically tunable oscillator comprising a vacuum tube including a residual amount of gas and having a cathode, a control grid, a second grid, a plate and a shield cooperating with said second grid and plate to form an ion trapping enclosure therebetween, an input circuit devoid of frequency determining resonant elements connected between said cathode and said control grid to control the number of electrons passing into said ion trapping enclosure and thereby to control the frequency of oscillation of an ion plasma therein, and an output circuit devoid of frequency determining elements resonant at the operating frequency connected between said second grid and said plate.

4. An electrically tunable oscillator as defined in claim 3 wherein said shield is integral with said plate.

5. An electrically tunable oscillator as defined in claim 3 wherein said shield is integral with said second grid.

6. An electrically tunable oscillator as defined in claim 3 wherein said shield is partially integral with said plate and partially integral with said second grid.

7. An electrically tunable oscillator comprising a vacuum tube including a residual amount of gas and having a cathode, a control grid, a second grid, a plate and a shield cooperating with said second grid and plate to form an ion trapping enclosure, an output circuit devoid of a resonant circuit resonant at the operating frequency connected between said second grid and said plate, and input circuit means devoid of a resonant circuit connected between said cathode and said control grid to apply a periodically varying signal thereto, whereby the output frequency varies as a function of the instantaneous voltage applied to said control grid.

8. An electrically tunable plasma oscillator comprising a vacuum tube including a residual amount of gas and having cathode, control grid, second grid and plate electrodes, input and output circuits coupled to said electrodes said output circuit providing an oscillation having a frequency determined by the formula:

$$f=2.15k\sqrt{\frac{gmV_c}{MA\sqrt{V_a}}}\text{ megacycles}$$

where $k$ is a geometry factor which is equal to 1 for plane parallel oscillations of the plasma, $g_m$ is the transconductance of the tube, M is the molecular weight of the residual gas molecules, A is the effective area in square centimeters of the plate, $V_c$ is the voltage on control grid and $V_a$ is the voltage on the plate.

9. An electrically tunable plasma oscillator comprising a vacuum tube including a residual amount of gas and having a plurality of electrodes, input and output circuits coupled to said electrodes, said output circuit being devoid of frequency determining elements and providing an oscillation having a frequency which varies directly as the square root of the potential on the control grid and which varies inversely as the fourth root of the potential on the plate.

10. An electrically tunable oscillator comprising a vacuum tube including a residual amount of gas and having a first cathode, a control grid, a second grid and a plate arranged in the order named, a second cathode and a third grid arranged to inject low velocity electrons into the space between said second grid and said plate, said plate and second and third grids cooperating to define an ion trapping enclosure, an output circuit devoid of any circuit resonant at the operating frequency coupled between said plate and said second cathode, and an input circuit coupled between said control grid and said first cathode to apply a frequency determining potential to said control grid.

11. An electrically tunable oscillator comprising a vacuum tube having an envelope containing a residual amount of gas and including a cathode, control grid, a second grid, a plate and a shield cooperating with said second grid and said plate to form an ion trapping enclosure therebetween, means to apply the same order of positive biasing potential relative to said cathode to said second grid, plate and shield, whereby said enclosure is substantially field-free, an output circuit coupled between said plate and said second grid, and an input circuit coupled between said cathode and said control grid, whereby the instantaneous potential applied to said input circuit determines the frequency of oscillation in said output circuit, said oscillations resulting from ion plasma oscillations in said field-free region into which high energy electrons are directed from said cathode and low energy electrons are directed from said plate by secondary emission.

12. An electrically tunable oscillator as defined in claim 11, wherein said vacuum tube contains gas having a pressure in the range of from $10^{-2}$ to $10^{-8}$ millimeters of mercury.

13. An electrically tunable oscillator comprising a vacuum tube including a residual amount of gas and having electrode means cooperating to define an ion trapping enclosure, said electrode means including a collector electrode, means to inject high velocity electrons into and thru said enclosure to said collector electrode, a source of low velocity electrons, said source of low velocity electrons comprising a secondary cathode, means to inject said low velocity electrons into said enclosure, and an output circuit devoid of frequency determining elements connected to said collector electrode.

14. An electrically tunable oscillator comprising a vacuum tube including a residual amount of gas and having electrode means cooperating to define an ion trapping enclosure, said electrode means including a collector electrode, means to project high velocity electrons into and thru said enclosure to said collector electrode, said collector electrode being arranged to release secondary electrons upon being bombarded by high velocity electrons, means causing said secondary electrons to flow into said ion trapping enclosure, and an output circuit devoid of frequency determining elements connected to said collector electrode.

15. An electrically tunable oscillator comprising a vacuum tube including a residual amount of gas and having electrode means cooperating to define an ion trapping enclosure, said electrode means including a collector electrode, means to project electrons into and thru said enclosure to said collector electrode, said ion trapping enclosure having an unobstructed opening adjacent said collector electrode to permit the free passage of electrons from said enclosure to said collector eletcrode, and an output circuit devoid of frequency determining elements connected to said collector electrode.

16. An electrically tunable oscillator comprising a vacuum tube including a residual amount of gas and having electrode means cooperating to define an ion trapping enclosure, said electrode means including a collector electrode, means to project electrons into and thru said enclosure to said collector electrode, said ion trapping enclosure having an unobstructed opening adjacent said collector electrode to permit the free passage of electrons to said collector electrode, a source of low velocity electrons, means to inject said low velocity electrons into said enclosure, and an output circuit devoid of frequency determining elements connected to said collector electrode.

17. An electrically tunable oscillator comprising a vacuum tube including a residual amount of gas and having electrode means cooperating to define an ion trapping enclosure in which an oscillating ion plasma is adapted to appear, said electrode means including a shield having opposite open ends and having an internally unobstructed space for the passage of electrons from one of said open ends to said opposite open end, a cathode, a control grid and a second grid aligned in the order named adjacent said one of said open ends of said shield, said electrode means also including a plate positioned adjacent said opposite open end of said shield, means to bias said second grid and to maintain said plate and said shield positive relative to said cathode, an output circuit connected between said plate and said second grid, and an input circuit connected between said cathode and said control grid for supplying energy to determine the frequency of oscillation of said plasma, whereby the instantaneous potential applied to said input circuit determines the frequency of oscillation in said output circuit.

References Cited in the file of this patent

UNITED STATES PATENTS

| | | |
|---|---|---|
| 1,617,172 | Smith | Feb. 8, 1927 |
| 1,629,009 | Snook | May 17, 1927 |
| 2,028,232 | Miller | Jan. 21, 1936 |
| 2,051,609 | Langmuir | Aug. 18, 1936 |
| 2,097,297 | Meier | Oct. 26, 1937 |
| 2,195,505 | Thompson | Apr. 2, 1940 |
| 2,235,190 | Alma et al. | Mar. 18, 1941 |
| 2,274,369 | Janssen | Feb. 24, 1942 |
| 2,452,337 | Strutt et al. | Oct. 26, 1948 |
| 2,570,124 | Hernqvist | Oct. 2, 1951 |
| 2,585,860 | Skellet et al. | Feb. 12, 1952 |
| 2,648,818 | Cohen | Aug. 11, 1953 |
| 2,707,771 | O'Neill | May 3, 1955 |

UNITED STATES PATENT OFFICE

Certificate of Correction

Patent No. 2,859,345 November 4, 1958

Karl G. Hernqvist

It is hereby certified that error appears in the printed specification of the above numbered patent requiring correction and that the said Letters Patent should read as corrected below.

Column 5, lines 33 to 36, the formula should appear as shown below instead of as in the patent:

$$f=2.15k\sqrt{\frac{g_m V_c}{MA\sqrt{V_a}}}\text{ megacycles}$$

Signed and sealed this 24th day of February 1959.

[SEAL]

Attest:

KARL H. AXLINE,
*Attesting Officer.*

ROBERT C. WATSON,
*Commissioner of Patents.*